United States Patent
Ohira et al.

(10) Patent No.: US 10,564,338 B2
(45) Date of Patent: Feb. 18, 2020

(54) POLARIZING PLATE, LIQUID CRYSTAL DISPLAY DEVICE HAVING THE SAME, AND METHOD OF MANUFACTURING POLARIZING PLATE

(71) Applicant: FUJIFILM Corporation, Tokyo (JP)

(72) Inventors: Shino Ohira, Kanagawa (JP); Mayumi Nojiri, Kanagawa (JP); Naoya Shimoju, Kanagawa (JP); Aiko Yoshida, Kanagawa (JP); Nobutaka Fukagawa, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 564 days.

(21) Appl. No.: 14/833,685

(22) Filed: Aug. 24, 2015

(65) Prior Publication Data
US 2016/0054493 A1   Feb. 25, 2016

(30) Foreign Application Priority Data
Aug. 25, 2014   (JP) .................................. 2014-171023

(51) Int. Cl.
*G02B 5/30* (2006.01)
*G02B 1/14* (2015.01)

(52) U.S. Cl.
CPC ........... *G02B 5/305* (2013.01); *G02B 5/3033* (2013.01); *G02B 1/14* (2015.01); *Y10T 428/1041* (2015.01)

(58) Field of Classification Search
CPC ........ G02B 1/14; G02B 5/3033; G02B 5/305; Y10T 428/1041
See application file for complete search history.

(56) References Cited

U.S. PATENT DOCUMENTS

| | | | |
|---|---|---|---|
| 8,390,187 B2 | 3/2013 | Jung et al. | |
| 8,859,060 B2 | 10/2014 | Fukagawa et al. | |
| 9,090,824 B2 | 7/2015 | Fukagawa et al. | |
| 2008/0262248 A1* | 10/2008 | Weigand .............. | C07D 311/78 549/331 |

(Continued)

FOREIGN PATENT DOCUMENTS

| CN | 102162870 A | 8/2011 |
|---|---|---|
| JP | 2011-118135 A | 6/2011 |

(Continued)

OTHER PUBLICATIONS

Office Action, issued by the Japanese Patent Office dated May 30, 2017, in connection with Japanese Patent Application No. 2014-171023.

(Continued)

*Primary Examiner* — Sophie Hon
(74) *Attorney, Agent, or Firm* — Edwards Neils LLC; Jean C. Edwards, Esq.

(57) ABSTRACT

A polarizing plate, which includes at least a polarizer layer including an iodine-dyed polyvinyl alcohol film, and the polarizing plate including a compound with a bond dissociation energy E1 of less than or equal to 90.0 kcal/mol, a peroxide radical forming energy E2 of less than or equal to 0.0 kcal/mol, and a polyiodide ion $I_5^-$ forming ability in an iodide compound-containing solution of less than or equal to 1.0.

11 Claims, 1 Drawing Sheet

(56) References Cited

U.S. PATENT DOCUMENTS

| | | | |
|---|---|---|---|
| 2010/0151156 A1* | 6/2010 | Kawabe | B29C 47/0021 |
| | | | 428/1.31 |
| 2010/0202051 A1* | 8/2010 | Yoshimi | G02B 1/04 |
| | | | 359/489.2 |
| 2011/0134374 A1 | 6/2011 | Fukagawa et al. | |
| 2011/0204767 A1* | 8/2011 | Jung | G02B 5/3025 |
| | | | 313/498 |
| 2013/0189449 A1 | 7/2013 | Fukagawa et al. | |
| 2014/0078583 A1* | 3/2014 | DeMeio | C09K 19/38 |
| | | | 359/487.02 |

FOREIGN PATENT DOCUMENTS

| | | |
|---|---|---|
| JP | 2011-175260 A | 9/2011 |
| JP | 2013-144798 A | 7/2013 |
| JP | 2013-174861 A | 9/2013 |
| KR | 2010-0024139 A | 3/2010 |

OTHER PUBLICATIONS

Office Action issued by the State Intellectual Property Office of the People's Republic of China dated Oct. 26, 2018, in connection with Chinese Patent Application No. 201510524879.4.

* cited by examiner

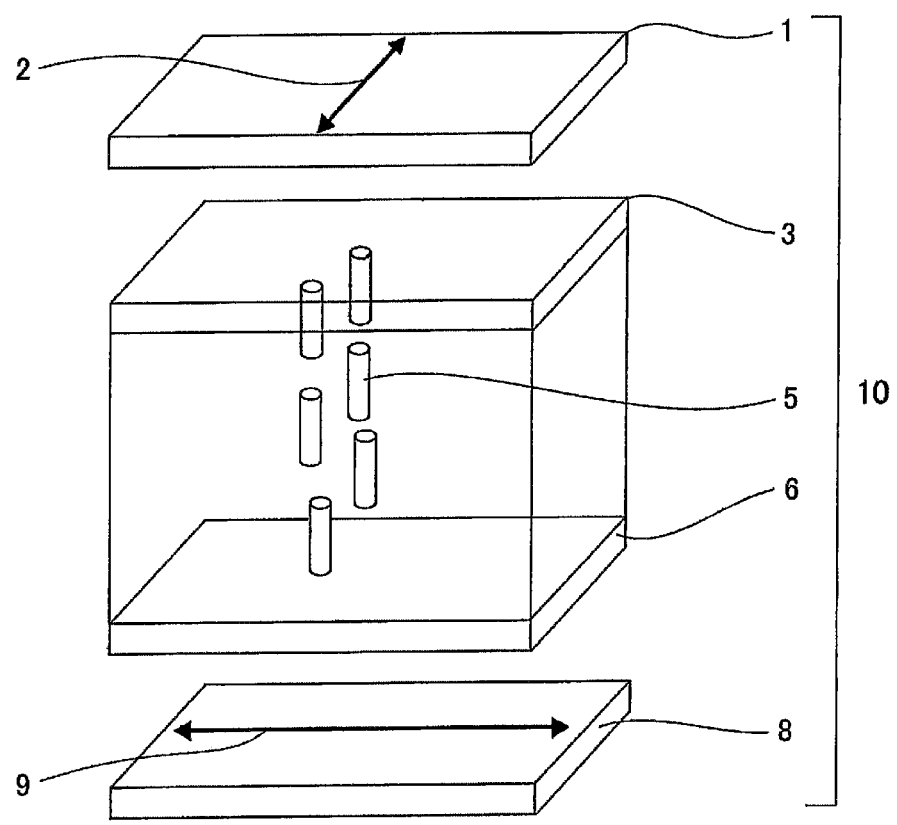

POLARIZING PLATE, LIQUID CRYSTAL DISPLAY DEVICE HAVING THE SAME, AND METHOD OF MANUFACTURING POLARIZING PLATE

CROSS-REFERENCE TO RELATED APPLICATIONS

This application claims priority under 35 U.S.C 119 to Japanese Patent Application No. 2014-171023 filed on Aug. 25, 2014. The above application is hereby expressly incorporated by reference, in its entirety.

BACKGROUND OF THE INVENTION

Field of the Invention

The present invention relates to a polarizing plate, liquid crystal display device having the same, and method of manufacturing polarizing plate.

Liquid crystal display devices have become common as compact image display devices that consume little energy, and their applications are spreading each year.

In the usual configuration of a liquid crystal display device, polarizing plates are disposed on both sides of a liquid crystal cell. The polarizing plates perform the role of passing light having a polarization plane in a specific direction. The performance of the polarizing plates greatly affects the performance of the liquid crystal display device. The polarizing plates generally contain at least a polarizer (also referred to hereinafter as a polarizer layer) comprised of a polyvinyl alcohol film in which iodine is adsorbed and oriented, and optionally comprise other layers such as protective films (for example, see JP-A-No. 2011-118135 and JP-A-No. 2013-174861, which are expressly incorporated herein by reference in their entirety).

Opportunities for using liquid crystal display devices not just indoors, but also outdoors (for example, portable devices and large-screen displays mounted outdoors) have increased in recent years. Thus, it has become necessary for the polarizing plates that constitute a liquid crystal display device to possess durability enabling them to withstand use in various environments, including use outdoors. That is because when the durability of a polarizing plate is poor, the image quality that is displayed on the display surface of the liquid crystal display device in which the polarizing plate is mounted ends up deteriorating.

An aspect of the present invention provides for a polarizing plate with good durability.

As regards the durability of polarizing plates, in Examples of above-cited publications, the durability of the polarizing plates is evaluated based on the crossed transmittance. The term "crossed transmittance" is the transmittance as measured in a state where the transmission axes of two polarizing plates are disposed perpendicularly (in a crossed-nicols arrangement). The low value of the crossed transmittance means the less light that leaks in a black state. The fact that reduced light leaks in a black state can effectively enhance the image quality (more specifically, enhance the contrast ratio and color reproducibility) that is displayed by the liquid crystal display device.

The image quality can be enhanced by reducing the light that leaks in a black state. It can also be enhanced by achieving both reduced light leakage in a black state and reduced tinting in a white state. That is because by achieving both reduced light leakage in a black state and reduced tinting in a white state, it becomes possible to increase the contrast ratio calculated as "maximum luminance (luminance of white state)/minimum luminance (luminance of black state)" and to enhance color reproducibility. The above-cited publications provide no disclosure of evaluating the durability of polarizing plates from the perspective of the tinting in a white state. However, the present inventors focused on the above points and conducted investigation based on new technical thinking about polarizing plates of reducing the light leakage in a black state (specifically, changing the crossed transmittance over time) and reducing the tinting in a white state (specifically, changing the hue over time). As a result, the present inventors discovered the following polarizing plate:

a polarizing plate, which comprises at least a polarizer layer comprised of an iodine-dyed polyvinyl alcohol film, and comprises a compound with a bond dissociation energy E1 of less than or equal to 90.0 kcal/mol, a peroxide radical forming energy E2 of less than or equal to 0.0 kcal/mol, and a polyiodide ion $I_5^-$ forming ability in an iodide compound-containing solution (also denoted simply as the "polyiodide ion $I_5^-$ forming ability" hereinafter) of less than or equal to 1.0.

The present invention was devised on that basis. The present inventors surmise as set forth further below with regard to the fact that the durability of the polarizing plate is enhanced by the above compound.

In the present invention, the above bond dissociation energy E1 is the reaction energy of the reaction based on reaction equation 1 below of compound RH (R represents the structural portion excluding the hydrogen atom H of the compound).

$$RH \rightarrow R \cdot + H \cdot \quad \text{(Reaction equation 1)}$$

That is, the above bond dissociation energy E1 means the reaction energy of the reaction by which H· (hydrogen radical) is dissociated from the compound RH.

The above peroxide radical forming energy E2 is the reaction energy of the reaction based on reaction equation 2 below of the R· (radical) produced by the reaction of the compound RH based on reaction equation 1.

$$R \cdot + O_2 \rightarrow ROO \cdot \quad \text{(Reaction equation 2)}$$

That is, the above peroxide radical forming energy E2 means the reaction energy of the reaction by which ROO· (peroxide radical) is formed.

E1 and E2 are values obtained by the following methods.

In compound RH, the energy $E_{RH}$, $E_{R\cdot}$, $E_{H\cdot}$, and $E_{ROO\cdot}$ of the most stable structures of the ground states of the various structures of RH, radical R·, H· dissociated from RH, and peroxide radical ROO· are calculated using the basis function (6-311++G(d,p)) by density functional theory (DFT), preferably using quantum computational chemistry software based on the B3LYP method. For electron multiplicity, the RH state is specified as a singlet, the states of radical R· and peroxide radical R—OO· are specified as doublets, and the state of the oxygen is specified as a triplet. The energy $E_{O2}$ of the most stable structure of the ground state of $O_2$ is calculated in the same manner. E1 and E2 are calculated using equations 1 and 2 below from the energy levels obtained.

$$E1 = (E_{R\cdot} + E_{H\cdot}) - E_{RH} \quad \text{(Equation 1)}$$

$$2 = E_{ROO\cdot} - (E_{R\cdot} + E_{O2}) \quad \text{(Equation 2)}$$

Publicly-known software such as the Gaussian series for quantum chemistry computational software produced by Gaussian Corp. can be employed as the quantum computational chemistry software. In Examples described further below, the quantum computational chemistry software Gaussian 09 (Revision D.01) produced by Gaussian Corp. was employed to calculation the energy of the most stable structure of the ground state as a DFT (B3LYP/6-311++G (d,p)) level.

E1 and E2 are calculated in the following manner when multiple reaction routes over which the peroxide radical ROO. is formed via reaction equations 1 and 2 above can be considered in terms of quantum computational chemistry.

In terms of quantum computational chemistry, bond dissociation energy E1 is calculated for all sites specified as places where H. dissociates from compound RH. Among the levels of E1 that are calculated, the bond dissociation energy E1a of the reaction route (reaction route a) of the lowest value of E1 and the reaction energy E2a of the reaction by which peroxide radical ROO. is formed by reaction equation 2 from the R. (radical) produced by the reaction of reaction equation 1 over reaction route a are calculated.

The reaction energy of reaction equation 2 for the reaction route b is referred to as E2b. In the reaction route b, the bond dissociation energy E1, referred to as E1b, is the value closest to the bond dissociation energy E1a of the reaction route a.

With the exception of cases where E1a<E1b (i.e. E1a is smaller than E1b) and E2a>E2b (i.e., E2a is larger than E2b), the bond dissociation energy E1a of reaction route a and the peroxide radical forming energy E2a are adopted as E1 and E2 of compound RH.

In cases where E1a<E1b and E2a>E2b with E1b−E1a≤15 kcal/mol (i.e., the value "E1b-E1a" is smaller than or equal to 15 kcal/mol) being satisfied, the bond dissociation energy E1b of reaction route b and the peroxide radical forming energy E2b are adopted as E1 and E2 of compound RH.

In cases where E1a<E1b and E2a>E2b without E1b−E1a≤15 kcal/mol being satisfied, the reaction route forming peroxide radical ROO. over reaction equations 1 and 2 is considered not to exist in terms of quantum computational chemistry. That is, E1 and E2 are considered not to exist for such a compound, and such a compound is considered not to correspond to the above compound.

The polyiodide ion $I_5^-$ forming ability in an iodide compound-containing solution is a value measured by the following method. Unless specifically stated otherwise, the operation described below was conducted in air and at room temperature (at 25° C. and a relative humidity of 40% RH).

An example of the method employing potassium iodide as the iodide compound will be given below. However, iodide compounds other than potassium iodide, such as lithium iodide, sodium iodide, zinc iodide, aluminum iodide, lead iodide, copper iodide, barium iodide, calcium iodide, tin iodide, and titanium iodide can also be employed as the iodide compound. The iodide compound-containing solution contains at least monoiodide ions $I^-$ ionized from the iodide compound.

(1) Potassium iodide (KI) is added to a mixed solvent (water:methanol=1:1 (volumetric ratio)) and thoroughly stirred to prepare a concentration 0.05 M potassium iodide solution.

A portion of the potassium iodide solution that has been prepared is used to prepare a solution of the targeted compound (the compound to be measured) below, and the remainder is used as a reference solution.

(2) A 0.025 mmol quantity of the targeted compound, the ability of which to form polyiodide ions $I_5^-$ in a potassium iodide solution is being measured, is added to 5 mL of the above potassium iodide solution and the mixture is thoroughly stirred and mixed. Here, the stirring and mixing will sometimes cause the targeted compound to thoroughly dissolve in the potassium iodide solution and will sometimes cause trace quantities (for example, less than or equal to 5 weight % of the total quantity of the targeted compound added to the solution) to remain as undissolved matter. In cases where there is a large amount of undissolved matter and it is difficult to correctly read the absorbance due to the scattering of light and the like caused by the undissolved matter during absorbance measurement (that is, in cases where the targeted compound has low solubility in water or methanol), it suffices to replace half of the methanol with a solvent in which the targeted compound has high solubility (this third solvent is described further below) and conduct measurement. Accordingly, in that case, a mixed solvent in the form of water:methanol:third solvent=1:0.5:0.5 (volumetric ratio) is employed as the mixed solvent. From the perspectives of high compatibility with water and low reactivity with iodide ions and iodide molecules, a third solvent in the form of ethanol, dimethylformamide (DMF), acetonitrile, acetone, or the like is preferably employed, but there is no limitation thereto. A mixture of two or more solvents can also be employed as the third solvent.

Pressure-resistant test tubes containing the targeted compound solution thus prepared or the reference solution are immersed for two hours in a hot water bath with the temperature of 60° C.

(3) Subsequently, a portion of the targeted compound solution is collected from the pressure-resistant test tube that has been removed from the bath and added to a 1 mm width (the distance traversed by the passing light) of a cuvette. Then, the cuvette is used to measure the absorbance of the targeted compound solution at a wavelength of 355 nm with a spectrophotometer.

(4) A portion of the reference solution, as well, is collected from the pressure-resistant test tube that has been immersed in a bath for the same period as the pressure-resistant test tube containing the targeted compound solution, and the absorbance thereof is measured in the same manner as for the targeted compound solution.

(5) The absorbance that is measured for the targeted compound solution in this manner is adopted as the ability to form polyiodide ions Is in an iodide compound-containing solution.

However, when the targeted compound solution has absorption at a wavelength of 355 nm prior to being immersed in the bath, the value that is obtained by subtracting the absorbance at a wavelength of 355 nm of the targeted compound solution prior to immersion in the bath from the absorbance as measured above is adopted as the ability to form polyiodide ions Is of the targeted compound in the potassium iodide solution. When the absorbance at a wavelength of 355 nm of the reference solution exceeds 0.0, the value that is obtained by subtracting the absorbance obtained for the reference solution from the absorbance obtained for the targeted compound solution is adopted as the ability to form polyiodide ions $I_5^-$ of the targeted compound in the potassium iodide solution.

The absorbance measurement by spectrophotometer is conducted by the comparison between the measurement result for the target solution measured and the measurement result for a blank solution. The measurement of the blank solution (referred to hereinafter as a "blank test") is conducted using the same cuvette as the cuvette employed to measure the absorbance of the targeted compound solution in order to eliminate or reduce the effect of the cuvette. The mixed solvent that is used to prepare the targeted compound solution (but not containing the targeted compound or potassium iodide) is used as the blank solution.

The polarizing plate is a member comprising at least a polarizer layer. When the polarizer layer has a self-supporting property, the polarizing plate can be comprised of only a polarizer layer. Also, a laminate having a protective film (polarizing plate protective film) on one or both surfaces of the polarizer surface is a preferable form of the polarizing plate. The polarizing plate protective film can be provided as a directly adjacent layer on the surface of the polarizer layer, or can be provided indirectly through one or more other layers. An example of "one or more other layers" is an adhesive layer and the like. The term "adhesive" in the present invention is used to refer to both adhesives and pressures-sensitive adhesives.

In one embodiment, the above compound is contained in the polarizer layer.

In one embodiment, the above compound is present at least on the surface, or in a surface layer region including the surface, of the polarizer layer.

A further aspect of the present invention relates to:

a method of manufacturing the above polarizing plate, comprising the step of forming at least one layer containing a compound with a bond dissociation energy E1 of less than or equal to 90.0 kcal/mol, a peroxide radical forming energy E2 of less than or equal to 0.0 kcal/mol, and a polyiodide ion $I_5^-$ forming ability in an iodide compound-containing solution of less than or equal to 1.0.

In one embodiment, the above manufacturing method comprises at least the step of dyeing a polyvinyl alcohol film with an iodine dye and the step of forming a polarizer layer containing the above compound by applying the above compound in an iodide compound-containing solution to the polyvinyl alcohol film at least one from among: before the dyeing step, during the dyeing step, or after the dyeing step.

In one embodiment, the above application is conducted by coating a solution containing the above compound to at least one surface of the polyvinyl alcohol film that has been dyed with iodine.

A further aspect of the present invention relates to a liquid crystal display device containing the polarizing plate set forth above.

The present invention can provides a polarizing plate with the reduced change in crossed transmittance and hue over time, and a liquid crystal display device equipped with this polarizing plate.

Other exemplary embodiments and advantages of the present invention may be ascertained by reviewing the present disclosure and the accompanying drawing.

BRIEF DESCRIPTION OF THE DRAWINGS

The present invention will be described in the following text by the exemplary, non-limiting embodiments shown in the drawing, wherein:

FIG. 1 is a schematic diagram showing an example of a liquid crystal display device according to an aspect of the present invention.

DETAILED DESCRIPTION OF THE EMBODIMENTS

The description given below may be based on representative modes of carrying out the present invention. However, the present invention is not limited to such implementation modes. In the present invention and in the present Specification, a range stated using the word "to" includes the preceding and succeeding numeric values as minimum and maximum values, respectively.

In the present Specification, angles (such as an angle of "90°") and their relations (such as "perpendicular," "parallel") are considered to include the scope of error that is permitted in the field of art to which the present invention belongs. For example, an angle means the precise angle±less than 10°, and the error with the precise angle is preferably less than or equal to 50, preferably less than or equal to 3°.

[1. Polarizing Plate]

The polarizing plate according to an aspect of the present invention contains a compound (also referred to as a "durability-enhancing agent" hereinafter) with a bond dissociation energy E1 of less than or equal to 90.0 kcal/mol, a peroxide radical forming energy E2 of less than or equal to 0.0 kcal/mol, and a polyiodide ion $I_5^-$ forming ability in an iodide compound-containing solution of less than or equal to 1.0.

Although not intended to limit the invention in any way, the present inventors assume the reasons for which it is possible to provide a polarizing plate having good durability by means of the above durability-enhancing agent to be as follows.

An iodine-dyed polyvinyl alcohol film normally contains at least iodine molecules $I_2$ and monoiodide ions $I^-$ that were contained in the iodine dye solution. Additionally, polyiodide ions $I_3^-$ formed by monoiodide ions and iodine molecules, and polyiodide ions $I_5^-$, formed by these polyiodide ions $I_3^-$ and iodine molecules, are normally contained. There is also a possibility of higher order polyiodide ions being contained. Additionally, it is said that complexes formed by any one or more of these polyiodide ions and polyvinyl alcohol resin (referred to simply as "polyvinyl alcohol" or "PVA" hereinafter) are contained. The present inventors assume that these complexes can contribute to keeping crossed transmittance low and preventing light leaks in a black state. Accordingly, reducing the quantity of such complexes probably increases the crossed transmittance.

In this regard, the present inventors assume that the fact that the above compound RH becomes a peroxide ROOH, and that this peroxide ROOH, as shown in the following schema, oxidizes monoiodide ions $I^-$ into iodine molecules $I_2$, can contribute to inhibiting the breakdown reaction of the above complexes in the polarizer layer. The lower the bond dissociation energy E1 and peroxide radical-forming energy E2, the more ROOH radicals are generated, promoting oxidation by the schema indicated below. As a result, the present inventors surmise that the breakdown reaction of the above complex can be inhibited, and a decrease in the crossed transmittance over time can be inhibited.

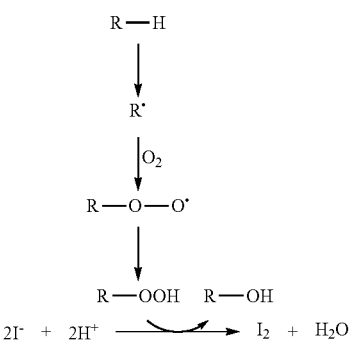

The present inventors additionally assume that moderately conducting various reactions forming polyiodide ions, such as the reaction forming polyiodide ions $I_3^-$ from monoiodide ions and the reaction forming $I_5^-$ from $I_3^-$, can contribute to reducing tinting in a white state over time. The lesser the polyiodide ion $I_5^-$ forming ability in an iodide compound-containing solution set forth above, the more moderately the reactions forming the various polyiodide ions advance. Here, the ability to form $I_5^-$ is adopted as an index of the ability to form polyiodide ions. The fact that the formation of $I_5^-$ progresses moderately means that the formation of $I_3^-$, which form $I_5^-$ with iodine molecules $I_2$, is also progressing moderately, and the reactions forming high-order polyiodide ions via the formation of $I_5^-$ are also progressing moderately. The polyiodide ion $I_5^-$ forming ability in an iodide compound-containing solution is a value obtained for a model test system to evaluate in relative fashion the degree to which the reaction forming polyiodide ions $I_5^-$ is progressing. Even a compound for which this value is 0.0 will not prevent the formation of polyiodide ions in the polarizer layer.

The present inventors have stated above their presumption that a compound with a bond dissociation energy E1 of less than or equal to 90.0 kcal/mol, a peroxide radical forming energy E2 of less than or equal to 0.0 kcal/mol, and a polyiodide ion $I_5^-$ forming ability in an iodide compound-containing solution of less than or equal to 1.0 makes it possible to enhance the durability of the polarizing plate. However, this is ultimately just a presumption, and is not intended to limit the present invention in any way.

The above polarizing plate will be described in greater detail below.

<1-1. Configuration of Polarizing Plate>

The above polarizing plate comprises at least a polarizer layer comprised of an iodine-dyed polyvinyl alcohol film. It can further comprise optional layer(s) such as one or more polarizing plate protective films, adhesive layers, or the like. The optionally provided layers will be described further below.

The polarizer layer contained in the polarizing plate is comprised of an iodine-dyed polyvinyl alcohol film. In the present invention, the "dyeing with iodine" is normally conducted by bringing an aqueous solution containing iodine $I_2$ and an iodide compound (a compound such as potassium iodide KI containing monoiodine ions $I^-$ and/or polyiodide ions such as $I_3^-$ or $I_5^-$) into contact with a polyvinyl alcohol film (such as by immersing a polyvinyl alcohol film in the above aqueous solution). The details will be described further below. The step of fabricating the polarizer layer normally comprises dyeing with iodine, a crosslinking step, and a stretching step. The details will be given further below. Once each of the above steps can be conducted on a polyvinyl alcohol film that has been formed on a resin substrate, the polyvinyl alcohol film can be peeled off the resin substrate to fabricate a polyvinyl alcohol film that has been dyed with iodine. A polyvinyl alcohol film can be formed on a resin substrate by coating a composition containing a polyvinyl alcohol resin on the surface of a resin substrate.

The thickness of the polarizer layer thus obtained, for example, falls within a range of 0.1 to 100 μm, and from the perspective of polarization performance, preferably falls within a range of 1 to 25 μm.

<1-2. Durability-Enhancing Agent>

In one embodiment of the above polarizing plate, a compound (durability-enhancing agent) with a bond dissociation energy E1 of less than or equal to 90.0 kcal/mol, a peroxide radical forming energy E2 of less than or equal to 0.0 kcal/mol, and a polyiodide ion $I_5^-$ forming ability in an iodide compound-containing solution of less than or equal to 1.0 can be contained in the polarizer layer. In another embodiment, the durability-enhancing agent can be contained in one or more layers provided in addition to the polarizer layer. In still another embodiment, the durability-enhancing agent can be contained in the polarizer layer and one or more layers provided in addition to the polarizer layer. The durability-enhancing agent can be in the form of a hydrate, solvate, or salt.

(1-2-1. Bond Dissociation Energy E1 and Peroxide Radical Forming Energy E2)

The durability-enhancing agent has a bond dissociation energy calculated according to the method set forth above of less than or equal to 90.0 kcal/mol and a peroxide radical-forming energy E2 of less than or equal to 0.0 kcal/mol. As set forth above, the present inventors assume that a compound with low E1 and E2 levels can inhibit the breakdown reaction of the above complexes. They have surmised that by means of a compound in which E1 and E2 are within the above-stated ranges, it is possible to inhibit a drop in the crossed transmittance over time in the polarizing plate by inhibiting the breakdown reaction of the above complexes. From these perspectives, E1 of the durability-enhancing agent is preferably less than or equal to 85.0 kcal/mol, more preferably less than or equal to 83.0 kcal/mol, and most preferably, less than or equal to 82.0 kcal/mol. From the perspective of availability, E1 of the durability-enhancing agent is, for example, greater than or equal to 50.0 kcal/mol. There is no specific lower limit for E1, because lowering of E1 can inhibit a drop in crossed transmittance over time.

From the same perspectives, it is preferable for E2 of the durability-enhancing agent to have a negative value, more preferable for E2 to have a value less than or equal to −5.0 kcal/mol, yet more preferable for E2 to have a value that is less than or equal to −6.0 kcal/mol, and most preferable for E2 to have a value that is less than or equal to −7.0 kcal/mol. From the perspective of availability, E2 in the durability-enhancing agent is, for example, greater than or equal to −50.0 kcal/mol. However, in the same manner as for E1, since the lower it is the better, no lower limit is specifically established.

(1-2-2. Polyiodide Ion $I_5^-$ Forming Ability)

As set forth above, the polyiodide ion $I_5^-$ forming ability of the durability-enhancing agent less than or equal to 1.0, preferably less than or equal to 0.5, and can be 0.0. As set forth above, a compound with a polyiodide ion $I_5^-$ forming ability in an iodide compound-containing solution of 0.0 will not prevent the formation of polyiodide ions in the polarizer layer.

The structure of the compound used as the durability-enhancing agent is not specifically limited so long as it has E1, E2, and the polyiodide ion $I_5^-$ forming ability falling within the above ranges. The compound having E1, E2, and the polyiodide ion $I_5^-$ forming ability within the above ranges can be selected from among commercial compounds or from among compounds synthesized by known methods for use as the durability-enhancing agent.

In one embodiment, the durability-enhancing agent is preferably a compound that has less effect on reducing polyiodide ions or has no such effect. That is because it is assumed that no reduction or less reduction of polyiodide ions can contribute to inhibiting reduction of the amount of complexes set forth above.

A compound with high reactivity with polyvinyl alcohol resin (PVA) is thought to preferentially bond with PVA over polyiodide ions, thereby reducing the amount of complex formed by polyiodide ions and PVA. Thus, in one embodiment, a compound with low reactivity with PVA is preferable as the durability-enhancing agent. From the same perspective, a compound with low reactivity with polyiodide ions is preferable as the durability-enhancing agent in one embodiment.

From the above perspectives, in one embodiment, examples of compounds that are preferable as the durability-enhancing agent are compounds in which the acid dissociation constant pKa of conjugate acids is less than or equal to 6.0. Acidic to weakly basic compounds are thought to either have less effect on reducing polyiodide ions or not to have such an effect. From this perspective, for example, compounds that do not contain amino groups (such as alkylamino groups and arylamino groups) in their structure are preferable as durability-enhancing agents.

An acid dissociation constant (value from the literature) that is recorded in publicly-known documents such as the *Chemical Handbook*, Basic Edition II (4th Rev. Ed., edited by the Japan Chemical Society, published by Maruzen K.K.), which is expressly incorporated herein by reference in its entirety, can be employed as the above acid dissociation constant pKa. A value measured by the alkalimetric titration method, for example, can also be employed.

Measurement by the alkalimetric titration method can be conducted in a mixed solvent (at a liquid temperature of 25° C.) of tetrahydrofuran (THF)/H$_2$O (water)=6/4 (volumetric ratio) with an automatic potentiometric titration measuring device (AT-610 made by Kyoto Electronics Manufacturing (Ltd.)). In cases where the targeted compound is present in trace amounts (for example, less than or equal to 5 weight % relative to the total quantity of targeted compound added to the above mixed solvent) in the form of insoluble matter and in cases where large amounts of insoluble matter are present, making it difficult to take accurate measurements (that is, cases where the targeted compound has little solubility in the above mixed solvent), half of the quantity of tetrahydrofuran can be replaced with a solvent in which the targeted compound exhibits high solubility (referred to as a "third solvent" hereinafter) to conduct the measurement. From the perspective of high compatibility with water, a third solvent such as dimethylsulfoxide (DMSO), N,N-dimethylformamide (DMF), or methanol (MeOH) can be employed. However, there is no limitation to these solvents, and two or more solvents can also be mixed for use as the third solvent.

In yet another embodiment, from the perspective of maintaining tight adhesion between layers contained in the polarizing plate, it is preferable to use a compound that has less or no effect on severing boric acid crosslinks.

Embodiments of compounds that are preferable as the durability-enhancing agent will be described below. However, as stated above, the durability-enhancing agent need only be a compound having E1, E2, and polyiodide ion I$_5^-$ forming ability that fall within the ranges given above, and is not limited to these embodiments.

Unless specifically stated otherwise, the groups that are referred to in the present invention can be substituted or unsubstituted. When a given group comprises a substituent, substituent S indicated below can be given as an example of the substituent. The "number of carbon atoms" of a group comprising a substituent means the number of carbon atoms of the portion excluding the substituent.

One embodiment of a compound that is preferable as the durability-enhancing agent is the compound denoted by general formula I below.

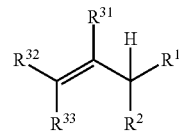

General formula I

In general formula I, each of $R^1$, $R^2$, $R^{31}$, $R^{32}$, and $R^{33}$ independently represents a hydrogen atom or a substituent. Further, $R^1$, $R^2$, $R^{31}$, $R^{32}$, and $R^{33}$ can be linked together to form a ring.

An example of the substituent represented as $R^1$ is substituent S described further below. An alkenyl group, cycloalkenyl group, or aryl group is preferable. The substituent can be electron-withdrawing group or electron-donating group. In one embodiment, it is preferable for the substituent represented as $R^1$ not to be an acyl group.

An example of the substituent represented as $R^2$ is substituent S described further below. An alkyl group, alkenyl group, cycloalkyl group, cycloalkenyl group, aryl group, or heterocyclic group is preferable. $R^2$ also preferably represents a hydrogen atom.

Examples of the substituents represented as $R^{31}$, $R^{32}$, and $R^{33}$ are substituent S described further below. $R^{31}$ and $R^{32}$ are also preferably linked together to form a ring structure. In that case, an aromatic ring structure is preferably formed. When $R^{31}$ and $R^{32}$ are not linked together to form a ring structure, $R^{31}$ preferably represents a hydrogen atom, and more preferably either $R^{32}$ or $R^{33}$ represents a hydrogen atom.

Substituent S is described below. Substituent S is a substituent selected from the following group of substituents.

[Substituent S]

Substituent S is an alkyl group (preferably an alkyl group with 1 to 20 carbon atoms such as a methyl group, ethyl group, isopropyl group, t-butyl group, pentyl group, heptyl group, 1-ethylpentyl group, 2-ethylhexyl group, benzyl group, 2-ethoxyethyl group, or 1-carboxymethyl group); alkenyl group (preferably an alkenyl group with 2 to 20 carbon atoms such as a vinyl group, allyl group, or oleyl group); an alkynyl group (preferably an alkynyl group with 2 to 20 carbon atoms, such as an ethynyl group, 2-propynyl group, 2-butynyl group, or phenyl ethynyl group); a cycloalkyl group (preferably a cycloalkyl group with 3 to 20 carbon atoms such as a cyclopropyl group, cyclopentyl group, cyclohexyl group, or 4-methylcyclohexyl group); aryl group (preferably an aryl group with 6 to 20 carbon atoms such as a phenyl group, 1-naphthyl group, 4-methoxyphenyl group, 2-chlorophenyl group, or 3-methylphenyl group); heterocyclic group (preferably a heterocyclic group with 0 to 20 carbon atoms, in which the hetero atoms constituting the ring are preferably oxygen atoms, nitrogen atoms, and sulfur atoms, in the form of a five-membered or six-membered benzene ring or hetero ring which can be fused, saturated ring, unsaturated ring, or aromatic ring such as a 2-pyridyl group, 4-pyridyl group, 2-imidazolyl group, 2-benzoimidazolyl group, 2-thiazolyl group, or 2-oxazolyl group); alkoxy group (preferably an alkoxy group with 1 to 20 carbon atoms such as a methoxy group, ethoxy group, isopropyloxy group, or benzyloxy group), aryloxy group (preferably an aryloxy group with 6 to 20 carbon atoms such as a phenoxy group, 1-naphthyloxy group, 3-methylphenoxy group, or 4-methoxyphenoxy group); alkylthio group (preferably an alkylthio group with 1 to 20 carbon atoms such as a methylthio group, ethylthio group, isopropylthio group, or benzylthio group); arylthio group (preferably an arylthio group with 6 to 20 carbon atoms such as a phenylthio group, 1-naphthylthio group, 3-methylphenylthio group, or 4-methoxyphenylthio group); acyl group (with an alkylcarbonyl group, alkenylcarbonyl group, arylcarbonyl group, or hetero ring carbonyl group being contained in the acyl group, the acyl group preferably comprising 20 or fewer carbon atoms, such as an acetyl group, pivaloyl group, acryloyl group, methacryloyl group, benzoyl group, or nicotinoyl group); alkoxycarbonyl group (preferably an alkoxycarbonyl group having 2 to 20 carbon atoms such as an ethoxycarbonyl group or 2-ethylhexyloxycarbonyl group); aryloxycarbonyl group (preferably an aryloxycarbonyl group having 7 to 20 carbon atoms such as a phenyloxycarbonyl group or napthyloxycarbonyl group); amino group (with the amino group containing an amino group, alkylamino group, arylamino group, or heterocyclic amino group, preferably an amino group with 0 to 20 carbon atoms such as an amino group, N,N-dimethylamino group, N,N-diethylamino group, N-ethylamino group, anilino group, 1-pyrrolidinyl group, piperidino group, or morphonyl group); alkylsulfonamide group or arylsulfonamide group (preferably an alkylsulfonamide group or arylsulfonamide group with 0 to 20 carbon atoms such as an N,N-dimethylsulfonamide group or N-phenyylsulfonamide group); alkylsulfamoyl group or arylsulfamoyl group (preferably an alkylsulfamoyl group or arylsulfamoyl group with 0 to 20 carbon atoms such as an N,N-dimethylsulfamoyl group or N-phenylsulfamoyl group); acyloxy group (preferably an acyloxy group with 1 to 20 carbon atoms such as an acetyloxy group or benzoyloxy group); alkylcarbamoyl group or arylcarbamoyl group (preferably an alkylcarbamoyl group or arylcarbamoyl group having 1 to 20 carbon atoms such as an N,N-dimethylcarbamoyl group or N-phenylcarbamoyl group); acylamino group (preferably an acylamino group having 1 to 20 carbon atoms such as an acetylamino group, acryloylamino group, benzoylamino group, or nicotinamide group); cyano group; hydroxyl group; mercapto group; sulfo group or a salt thereof; carboxy group or salt thereof; phosphoric acid group or salt thereof; onio group (such as the sulfonio group of sulfonium salt, the ammonio group of ammonium salt, the iodonio group of iodonium salt, or the phosphonio group of phosphonium salt); thioacyl group; alkoxythiocarbonyl group; aryloxythiocarbonyl group; alkylthiocarbamoyl group; or arylthiocarbamoyl group (examples of preferable ranges and specific examples of which being those of the corresponding acyl group, alkoxycarbonyl group, aryloxycarbonyl group, alkylcarbamoyl group, or arylcarbamoyl group in which the C(=O) moiety has been replaced with (C=S)); and halogen atoms (such as fluorine atoms, chlorine atoms, bromine atoms, and iodine atoms).

The above substituents can be further substituted with substituents. Examples of the further substituted substituent are substituent S set forth above. Specific examples are an aralkyl group in which an aryl group has been substituted onto an alkyl group, or a group where an alkoxycarbonyl group, cyano group, or the like has been substituted onto an alkyl group.

A preferable embodiment of the compound dented by general formula I is the compound represented by general formula I-2 below.

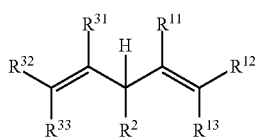

General formula I-2

In general formula I-2, each of $R^2$, $R^{31}$, $R^{32}$, and $R^{33}$ is defined as in general formula I; each independently represents a hydrogen atom or a substituent. Each of $R^{11}$, $R^{12}$, and $R^{13}$ independently represents a hydrogen atom or a substituent. $R^{11}$, $R^{12}$, $R^{13}$, $R^2$, $R^{31}$, $R^{32}$, and $R^{33}$ can be linked together to form a ring structure.

Specific examples and preferable examples of $R^2$, $R^{31}$, $R^{32}$, and $R^{33}$ are identical to those for general formula I. Specific examples and preferable examples of $R^{11}$, $R^{12}$, and $R^{13}$ are identical to the specific examples and preferable examples given for $R^{31}$, $R^{32}$, and $R^{33}$, respectively.

A preferable embodiment of the compound denoted by general formula I is the compound represented by general formula II below.

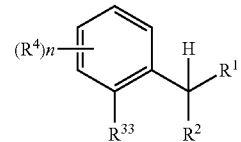

General formula II

In general formula II, each of $R^1$, $R^2$, $R^{33}$, and $R^4$ independently represents a hydrogen atom or a substituent, and n represents 0 or an integer in the range of 1 to 4. $R^1$, $R^2$, $R^{33}$, and $R^4$ can be linked together to form a ring structure.

Specific examples and preferable examples of $R^1$ and $R^2$ are the same as those given for general formula I.

Examples of the substituents represented as $R^{33}$ and $R^4$ are substituent S. Alkyl groups, alkoxy groups, aryloxy groups, acyl groups, acyloxy groups, alkoxycarbonyl groups, halogen atoms and the like are preferable. $R^{33}$ and $R^4$ also preferably represent hydrogen atoms.

When two or more members selected from the group consisting of $R^1$, $R^2$, $R^{33}$, and $R^4$ are linked to form a ring structure, the partial structure (referred to as the "linking group" hereinafter) that is formed by linking the two or more is preferably a single bond; any one of —$CR^aR^b$—, an alkylene group, alkenylene group, arylene group, —O—, —S—, —$NR^c$—, —(C=O)—, —(S=O)—, —(S=O)$_2$— (where $R^a$ and $R^b$ independently represent hydrogen atoms or substituents, $R^c$ represents a hydrogen atom or a substituent, and substituent S is an example of the substituents); or a divalent linking group comprised of a combination of two or more the above-described structure.

A preferable embodiment of the compound represented by general formula II is the compound-represented by general formula II-2 below.

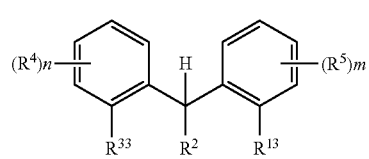

General formula II-2

In general formula II-2, each of $R^2$, $R^4$, $R^5$, $R^{13}$, and $R^{33}$ independently represents a hydrogen atom or a substituent, and each of n and m independently represents 0 or an integer in the range of 1 to 4.

Two or more members selected from the group consisting of $R^2$, $R^4$, $R^5$, $R^{13}$, and $R^{33}$ can be linked to form a ring structure. Specific examples of the structure of the linking group are identical to those given from general formula II.

Examples of the substituents represented as $R^2$, $R^4$, $R^5$, $R^{13}$, and $R^{33}$ are substituent S. Specific examples and preferable examples of $R^2$ are the same as those given for general formula II. Specific examples and preferable examples of $R^4$ and $R^{33}$ are identical to those given for general formula II. Specific examples and preferable examples of $R^5$ and $R^{13}$ are identical to the specific examples and preferable examples given for $R^4$ and $R^{33}$, respectively.

Two or more members selected from the group consisting of $R^2$, $R^4$, $R^5$, $R^{13}$, and $R^{33}$ are preferably linked together to form a ring structure. Specifically, it is preferable for $R^{13}$ and $R^{33}$ to be linked to form a ring structure. The number of atoms in the linking group in that case is preferably 0 to 3. The linking group is preferably a single bond; any one from among —$CR^aR^b$—, an alkylene, —O—, —S—, —$NR^c$—, and —(C=O)—; or a divalent linking group comprised of a combination of two or more of the above. $R^a$, $R^b$, and $R^c$ are identical as described above.

A preferable embodiment of the compound represented as general formula II is the compound represented as general formula II-3 below.

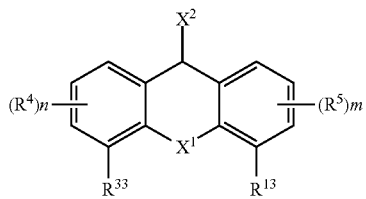

General formula II-3

In general formula II-3, each of $R^4$, $R^5$, $R^{13}$, and $R^{33}$ independently represents a hydrogen atom or a substituent, and each of n and m independently represents 0 or an integer in the range of 1 to 4. Details in this formula are identical to those given for general formula II-2.

In general formula II-3, $X^1$ represents —$(CR^aR^b)$a- or a hetero atom, with $R^a$ and $R^b$ being identical as above, a represents 0 or an integer in the range of 0 to 3. When $X^1$ is —$(CR^aR^b)$a-, a is preferably 1; each of $R^a$ and $R^b$ preferably independently represents a hydrogen atom or an alkyl group, and more preferably a hydrogen atom. Oxygen atoms are preferable as hetero atoms.

In general formula II-3, $X^2$ represents a hydrogen atom or a substituent. Substituent S set forth above is an example of the substituent.

Specific examples of the compound represented as general formula II-3 are xanthene, xanthohydrol, and 9,10-dihydroanthracene.

Among the compounds included in the compounds represented as the general formulas set forth above, some have ranges of one or more from among E1, E2, and the polyiodide ion $I_5^-$ forming ability that fall outside the ranges set forth above. A compound with an E1, an E2, and a polyiodide ion $I_5^-$ forming ability that fall within the ranges set forth above is selected for use as the durability-enhancing agent.

The quantity of durability-enhancing agent that is added to the polarizing plate is described further below.

<1-3. Layer Containing the Durability-Enhancing Agent>

The durability-enhancing agent set forth above is contained in one or more layers constituting a polarizing plate.

A single compound can be employed as the durability-enhancing agent, or two or more different compounds can be combined for use. When two or more durability-enhancing agents are combined for use, the content of the durability-enhancing agent refers to the total quantity of the compounds combined for use.

The present inventors surmise that the durability-enhancing agent can gradually migrate over time from the one layer into the polarizer layer, thereby contributing to enhancing durability in the polarizer layer, when the durability-enhancing agent is contained in a layer other than the polarizer layer.

When the durability-enhancing agent is contained in the polarizer layer, the embodiment can be such that it is contained uniformly throughout the entire polarizer layer, or the embodiment can be such that it is unevenly distributed in a partial region of the polarizer layer. As set forth above, the present inventors presume that the durability-enhancing agent reacts with oxygen to become a peroxide, thereby contributing to inhibiting the breakdown reaction of the above-described complex. The reaction between oxygen penetrating into the polarizing plate from the air and the durability-enhancing agent is thought to progress more readily in the surface of the polarizer layer or in a partial region (near-surface region) running from the surface in the direction of thickness of the polarizer layer than in other regions. This is because the surface and the near-surface region are areas where the reaction between oxygen that has passed through the layer adjacent to the polarizer layer and reached the polarizer layer with the durability-enhancing agent tends to progress readily. Accordingly, it is preferable for the durability-enhancing agent to be present in the surface of the polarizer layer or the near-surface region including the surface. As an example, the near-surface region can be a region with a thickness that is about ¹⁄₁₀ to ⅓ of the thickness of the polarizer layer. However, the thickness of the near-surface region is not specifically limited. In the polarizer layer, the concentration of the durability-enhancing agent can, for example, constitute a concentration gradient that changes continuously or in stages moving from the interior toward the surface.

An example of a means of causing the durability-enhancing agent to be present in the surface of the polarizer and/or surface layer region in the above manner is the method of coating the durability-enhancing agent as is, or in the form of a solution, on the surface of the polarizer layer.

By employing the method of adding the durability-enhancing agent to the composition for fabricating individual layers such as the polarizer layer and the method of adding the durability-enhancing agent in the step of fabricating individual layers, it is possible to obtain a polarizing plate that contains the durability-enhancing agent in at least one layer constituting the polarizing plate, such as the polarizer layer.

When conducting a stretching operation in the step of fabricating one or more of the polarizing plate layer and the layers constituting the polarizing plate in addition to the polarizing plate layer, a method such as using a liquid incorporating the durability-enhancing agent in the stretching operation is an example of a means of causing the durability-enhancing agent to be present in the interior of the polarizer layer.

Details relating to the above will be set forth further below.

[2. Method of Manufacturing a Polarizing Plate]

A further aspect of the present invention relates to a method of manufacturing the above polarizing plate.

The manufacturing method comprises a step of forming at least one layer containing the durability-enhancing agent in an iodide compound-containing solution.

The details of the manufacturing method will be set forth below.

<2-1. Preparation of Iodine-Dyed Polyvinyl Alcohol Film>

The polyvinyl alcohol film employed can be in the form of a commercial product or one that has been manufactured by known methods. The method described in JP-A-No. 2007-86748, paragraphs 0213 to 0237, for example, can be employed as the method of manufacturing the polyvinyl alcohol film. Japanese Patent No. 3342516, JP-A-Heisei No. 09-328593, JP-A-Nos. 2001-302817 and 2002-144401, and the like can be referred to for the manufacturing of polyvinyl alcohol films. The term "polyvinyl alcohol film" means a film containing polyvinyl alcohol resin as the resin constituting the film. The greater part of the resin constituting the film, for example, 80 weight % or more, is preferably accounted for by polyvinyl alcohol resin. All of the resin constituting the film can be polyvinyl alcohol resin. The polyvinyl alcohol resin will normally be in the form of saponified polyvinyl acetate, but by way of example, it can contain components that are capable of copolymerizing with vinyl acetate, such as unsaturated carboxylic acids, unsaturated sulfonic acid, olefins, and vinyl ethers. It can also be a polyvinyl alcohol resin that has been modified by incorporating acetoacetyl groups, sulfonic acid groups, carboxyl groups, oxyalkylene groups, or the like.

The step of manufacturing a polarizer (polarizer layer) comprised of a polyvinyl alcohol film that has been dyed with iodine normally comprises a dyeing step (iodine dyeing), a crosslinking step, and a stretching step. Optionally, it can also comprise a swelling step, a cleaning step, and the like. The above steps can be implemented in any order, either simultaneously or sequentially.

The stretching step is normally conducted by implementing uniaxial stretching. The stretching step can be implemented, for example, by a longitudinal uniaxial stretching method such as that described in U.S. Pat. No. 2,454,515, or by a tenter method such as that described in JP-A-No. 2002-86554. The contents of the above publications are expressly incorporated herein by reference in their entirety. The stretching ratio is preferably 2 to 12-fold, more preferably 3 to 10-fold. The stretching step can normally be conducted by wet stretching. It can be conducted after a swelling step. The stretching step can also be implemented multiple times. For example, the stretched film prior to the dyeing step can be stretched in the dyeing step, in the crosslinking step, or in both of these steps.

An iodide compound can be incorporated into the processing liquid employed in wet stretching (also referred to as a "stretching bath" hereinafter). When an iodide compound is incorporated into the processing liquid, the concentration of the iodide compound can be, for example, 0.1 to 10 weight %, preferably 0.2 to 5 weight %. The liquid temperature of the stretching bath in wet stretching is normally greater than or equal to 25° C., preferably 30 to 85° C., and more preferably, falls within a range of 50 to 70° C. The immersion period is normally 10 to 800 seconds, preferably 30 to 500 seconds.

The dyeing step (iodine dyeing step) can be conducted in a gas phase or liquid phase. An example of a dyeing method that is conducted in a liquid phase is the method of immersing a polyvinyl alcohol film in an iodine-potassium iodide aqueous solution (also referred to hereinafter as the "dyeing bath"). The iodine-potassium iodide aqueous solution preferably has an iodine concentration of 0.1 to 20 g/L, a potassium iodide concentration of 1 to 200 g/L, and an iodine to potassium iodide weight ratio of 1 to 200. The dyeing time is preferably 10 to 5000 seconds, and the liquid temperature of the dyeing bath during dyeing is preferably 5 to 60° C. Immersion is not the only means that can be used for dyeing; any other means, such as coating the dyeing liquid and spraying, can be employed. The dyeing step can be conducted either before or after the stretching step. Further, stretching can be conducted during dyeing in the liquid phase. Since suitable swelling of the film can facilitate stretching, it is preferably to conduct dyeing in the liquid phase prior to the stretching step or simultaneously with stretching. When the film is being stretched multiple times, the "stretching step" refers to the step with the greatest stretching ratio among the multiple stretching steps that are conducted.

The crosslinking step is normally conducted using a crosslinking agent in the form of a boron compound. The sequence of the crosslinking step is not specifically limited. The crosslinking step can be conducted with the dyeing step and/or the stretching step. Further, the crosslinking step can be conducted one or multiple times. Examples of the boron compound are boric acid and borax. The boron compound is generally employed in the form of an aqueous solution or a solution containing a solvent in the form of a mixed solvent of water and an organic solvent. Normally, a boric acid aqueous solution is employed. The concentration of boric acid in the boric acid aqueous solution is, for example, 1 to 10 weight parts, and preferably falls within a range of 2 to 7 weight parts, per 100 weight parts of solvent. An iodide compound such as potassium iodide can be incorporated into the boric acid aqueous solution or the like (also referred to as the "crosslinking bath" hereinafter). When incorporating an iodide compound into the boric acid aqueous solution, the concentration of the iodide compound is, for example, 0.1 to 10 weight parts, preferably falling within a range of 0.5 to 8 weight parts, per 100 weight parts of solvent. Conducting a crosslinking step can crosslink and stabilize the polyvinyl alcohol, and is thus preferably from the perspective of enhancing polarization performance.

When the crosslinking step is conducted by immersing the polyvinyl alcohol film in a crosslinking bath, the liquid temperature of the crosslinking bath is normally greater than or equal to 25° C., preferably 30 to 85° C., and preferably falls within a range of 30 to 60° C. The immersion time is normally 5 to 800 seconds, preferably about 8 to 500 seconds.

The swelling step can be conducted by immersing the polyvinyl alcohol film, either before or after the dyeing step, in the processing liquid. Normally, water, distilled water, or purified water is employed as the processing liquid. Water is preferably the component accounting for the greatest portion of the processing liquid. Small quantities of an iodide compound, surfactants, and other additives, as well as alcohols and other organic solvents can be introduced into the processing liquid. When the processing liquid contains an iodide compound, the concentration of the iodide compound is, for example, 0.1 to 10 weight %, preferably 0.2 to 5 weight %.

Adjusting the liquid temperature of the processing liquid in the swelling step to about 20 to 45° C. is normally preferable. A temperature of 25 to 40° C. is preferred. The period of immersion in the processing liquid is normally 10 to 300 seconds, preferably falling within a range of 20 to 240 seconds.

A cleaning step can be conducted using a cleaning liquid in the form of a potassium iodide solution. The concentration of the potassium iodide in the potassium iodide solution is normally 0.5 to 10 weight %, preferably 0.5 to 8 weight %, and preferably, falls within a range of 1 to 6 weight %.

The liquid temperature of the cleaning liquid is normally 15 to 60° C., preferably 25 to 40° C. The period of immersion in the cleaning liquid is normally 1 to 120 seconds, preferably falling within a range of 3 to 90 seconds.

The cleaning step can be conducted by washing in water. Washing in water is normally conducted by immersing the polyvinyl alcohol film in pure water such as ion exchange water or distilled water. The liquid temperature of the water that is used for washing is normally 5 to 50° C., preferably 10 to 45° C., and preferably falls within a range of 15 to 40° C. The period of immersion in water is normally 5 to 300 seconds, preferably about 10 to 240 seconds.

After each of the above steps has been implemented, a drying step can be finally implemented. The drying step can be conducted, for example, for about 30 seconds to 60 minutes in a 30 to 100° C. atmosphere.

JP-A-No. 2011-237580, paragraphs 0039 to 0050, can be referred to with regard to the process of manufacturing a polarizer. The content of the above publication is expressly incorporated herein by reference in its entirety, <2.2 Step of Forming at Least One Layer Containing the Durability-Enhancing Agent>

The polarizing plate set forth above comprises at least one layer containing the durability-enhancing agent. In one embodiment the layer containing the durability-enhancing agent is a polarizer layer, in another embodiment it is a polarizing plate protective layer, and in still another embodiment, it is an adhesive layer.

<2.3 Method of Forming a Polarizer Layer Containing the Durability-Enhancing Agent>

The method of adding the durability-enhancing agent to the film-forming composition used to form the polyvinyl alcohol film is an example of one method of incorporating the durability-enhancing agent into the polarizer layer.

Another example is the method of applying the durability-enhancing agent to the polyvinyl alcohol film at least prior to the dyeing step, during the dyeing step, or after the dyeing step. In the present invention, the term "applying" means bringing the polyvinyl alcohol film into contact with the durability-enhancing agent by any means such as coating, immersion, or spraying, and preferably refers to adsorption or permeation. To that end, for example, the method of adding the durability-enhancing agent to a liquid phase such as the above described stretching bath, crosslinking bath, processing liquid, or cleaning liquid can be employed. A further example is the method of coating a solution containing the durability-enhancing agent on at least one surface of the polyvinyl alcohol film after iodine dyeing. Application by coating such as is set forth above is preferable as a method of obtaining a polarizer layer in which the durability-enhancing agent is present on the surface or in a surface layer region including the surface.

One of the above methods can be implemented, or two or more can be combined for use. Regardless of which of the above methods is employed, it is preferable to control the manufacturing conditions such that a desired quantity of the durability-enhancing agent is incorporated into the polarizer layer. When the compatibility of the durability-enhancing agent and the polyvinyl alcohol resin are taken into account, the content of the durability-enhancing agent in the polarizer layer preferably falls within a range of 0.01 to 30 weight parts, more preferably falls within a range of 0.01 to 10 weight parts, and most preferably, falls within a range of 1 to 10 weight parts, per 100 weight parts of polyvinyl alcohol resin.

When employing the method of coating a solution containing the durability-enhancing agent on at least one surface of a polyvinyl alcohol film after iodine dyeing, the solvent in the coating liquid is not specifically limited. One, or a mixture of two or more solvents in any ratio, can be employed. The solvent is preferably one in which the durability-enhancing agent exhibits high solubility, and can be suitably selected based on the durability-enhancing agent. Examples are methyl ethyl ketone, methylene chloride, methanol, methyl acetate, and tetrahydrofuran (THF). However, there is no limitation to these solvents.

The concentration of the durability-enhancing agent in the coating liquid is, for example, about 0.0005 to 50 mol/L. The quantity of coating liquid that is coated to the polyvinyl alcohol film is, for example, about 1 to 60 mL/m$^2$.

<2-4. Method of Forming an Adhesive Layer Containing the Durability-Enhancing Agent>

In the polarizing plate, an adhesive layer is sometimes provided adjacent to the polarizer layer to enhance adhesion between the polarizer layer and other layers, or between the polarizing plate and other members. In such cases, it is possible to incorporate the durability-enhancing agent into the adhesive layer. Taking into account compatibility with the resin, the content of the durability-enhancing agent in the adhesive layer preferably falls within a range of 0.01 to 30 weight parts, more preferably within a range of 0.01 to 10 weight parts, and most preferably, within a range of 1 to 10 weight parts, per 100 weight parts of resin constituting the adhesive layer.

The resin employed in the adhesive layer is not specifically limited. All resins known to be present in adhesives can be used without restriction. An adhesive that is known to be viscous (a pressures-sensitive adhesive) or an adhesive that exhibits adhesion when dried or by means of a reaction can be employed. In the present invention, the word "adhesive" means both adhesives and pressures-sensitive adhesives.

The adhesive layer normally contains resin as the component constituting the greatest portion (the main component). The resin normally accounts for 30 weight % or more and, for example, 90 weight % or less, of the adhesive layer. It preferably accounts for 70 weight % or more of the adhesive layer. The resin can be a mixture of multiple resins. Examples of mixtures are mixtures of polymers in which some of the resin has been modified, resins synthesized by reaction with a different monomer, and other mixtures in which the main structure is comprised almost entirely of a single component. When the resin is a mixture, it means that the total quantity of the mixture falls within the above-stated range.

The adhesive layer can be formed, for example, by coating on at least one surface of the polarizer layer or any other layer provided (such as a polarizing plate protective film) a coating liquid containing an adhesive in the prescribed ratio, and drying it. The coating liquid can be prepared by any suitable method. By way of example, a coating liquid in the form of a commercial solution or dispersion can be employed, an additional solvent can be added to a commercial solution or dispersion for use, or the solid components can be dissolved or dispersed in any of various solvents for use.

An adhesive having any suitable properties, form, or adhesive mechanism can be employed based on the objective. Specific examples of adhesives are water-soluble adhesives, ultraviolet radiation-curable adhesives, emulsion-type adhesives, latex-type adhesives, mastic adhesives, multiple layer adhesives, paste adhesives, foam-type adhesives, supported-film adhesives, thermoplastic adhesives, heat-fused adhesives, thermally solidifying adhesives, hot melt adhesives, heat-activated adhesives, heat seal adhesives, thermosetting adhesives, contact adhesives, pressures-sensitive adhesives, polymerizing adhesives, solvent-type adhesives, and solvent-activated adhesives. Water-soluble adhesives and ultraviolet radiation-curable adhesives are preferable. From the perspectives of affinity with the polyvinyl alcohol resin, the use of a water-soluble adhesive or ultraviolet radiation-curable adhesive is preferable in an adhesive layer that is adjacent to the polarizer layer.

The water-soluble adhesive can contain at least either a water-soluble natural polymer or synthetic polymer, for example. Examples of natural polymers are proteins and starches. Examples of synthetic polymers are resol resins, urea resins, melamine resins, polyethylene oxide, polyacrylamide, polyvinyl pyrrolidone, acrylic esters, methacrylic esters, and polyvinyl alcohol resins. Of these, water-soluble adhesives containing polyvinyl alcohol resins are preferably employed. Because water-soluble adhesives containing polyvinyl alcohol resins can adhere well to polyvinyl alcohol films (the polarizer layer), their use in adhesive layers adjacent to the polarizer layer is preferable.

When an adhesive layer formed of a water-soluble adhesive containing a polyvinyl alcohol resin is adjacent to the polarizer layer, there are cases where a state is achieved such that the adhesive layer and the polarizer layer can be considered to be a single, integrated layer.

The adhesive layer can contain a metal compound, preferably a metal colloid. For details, JP-A-No. 2012-014148, paragraphs 0079 to 0083 can be referred. The content of the above publication is expressly incorporated herein by reference in its entirety.

Examples of other additives are various additives commonly employed in the adhesive layers of polarizing plates, such as chain transfer agents, sensitizers, tackifiers, thermoplastic resins, fillers, flow control agents, plasticizers, and antifoaming agents. These can be used singly or in combinations of two or more. The quantity of additives that are blended in is preferably less than or equal to 40 weight %, more preferably greater than or equal to 0.1 weight % and less than or equal to 30 weight %, of the resin (adhesive).

The adhesive layer can contain a crosslinking agent such as boric acid. It is thought that by incorporating boric acid into the adhesive layer, adhesion can be enhanced between the polarizer layer and the adhesive layer and between layers of optionally provided polarizing plate protective films and adhesive layers through the formation of a crosslinked structure (boric acid crosslinking) in the form of bonds with the hydroxyl groups in the resin constituting the adhesive layer. For example, because the polarizing plate protective film is normally subjected to a saponification treatment, it has hydroxyl groups on the surface of the film. A polarizing plate protective film formed of cellulose ester resin will have numerous hydroxyl groups on the surface due to the saponification treatment. A polarizing plate protective film formed of a polyester resin such as polyethylene terephthalate or a cycloolefin resin can also have surface hydroxyl groups due to a surface treatment such as saponification. By incorporating the durability-enhancing agent, particularly the compound represented as general formula I and boric acid, into an adhesive layer that is adjacent to a polarizing plate protective film that has been imparted with surface hydroxyl groups by such a saponification treatment, boric acid crosslinking can be promoted between the adhesive layer and the polarizer layer, and between the adhesive layer and the polarizing plate protective film, resulting in improved adhesiveness between the polarizer layer and a polarizing plate protective film.

When blending boric acid into an adhesive layer containing the durability-enhancing agent, the quantity is preferably greater than or equal to 0.1 weight part and less than or equal to 10,000 weight parts, more preferably greater than or equal to 1 weight part and less than or equal to 1,000 weight parts, per 100 weight parts of durability-enhancing agent. An adhesive layer containing a crosslinking agent and a durability-enhancing agent such as those set forth above, formed of a polyvinyl alcohol resin or a cellulose ester resin, which is a resin having numerous hydroxyl groups, is preferably provided as an adjacent layer.

The thickness of the adhesive layer can be suitably set. Specifically, when a pressures-sensitive adhesive is employed in the adhesive layer, the thickness of the adhesive layer preferably falls within a range of 0.1 to 50 µm, more preferably within a range of 0.5 to 20 µm, yet more preferably within a range of 1 to 15 µm, and most preferably, within a range of 5 to 10 µm. When an adhesive is employed in the adhesive layer, the thickness of the adhesive layer preferably falls within a range of 10 to 500 nm, more preferably within a range of 10 to 400 nm, and most preferably within a range of 20 to 350 nm. The adhesive layer can be formed by a known coating method such as spin coating, roll coating, flow coating, dip coating, or bar coating to apply an adhesive or pressures-sensitive adhesive to the surface of polarizer layer or optionally provided polarizing plate protective film.

The adhesive layer can be provided directly or indirectly through other layer(s) such as primer layers (also called adhesion-enhancing layers) on one or both of the surfaces of the polarizer layer based on the mode employed. The adhesive layer can also be formed as a layer that is not adjacent to the polarizer layer. In that case, the durability-enhancing agent can be incorporated into the adhesive layer. In other embodiments, the durability-enhancing agent can be incorporated into the adhesive layer adjacent to the polarizer layer.

<2-5. Method of Forming Polarizing Plate Protective Film Containing the Durability-Enhancing Agents>

The polarizing plate can optionally comprise a polarizing plate protective film. The durability-enhancing agent can be incorporated into the polarizing plate protective film.

Taking into account compatibility with the resin, the content of the durability-enhancing agent in the polarizing plate protective film preferably falls within a range of 0.01 to 30 weight parts, more preferably within a range of 0.01 to 10 weight parts, and most preferably, within a range of 1.0 to 10 weight parts, per 100 weight parts of the resin constituting the polarizing plate protective film.

Examples of the raw materials of the polarizing plate protective film are: cellulose ester resins, polycarbonate resins, polyester carbonate resins, polyallylate resins, polysulfone resins, polyether sulfone resins, norbornene resins, other cycloolefin resins, polystyrene resins, polacrylate resins, polymethacrylate resins, polyester resins, olefinmaleimide resins, glutarimide resins, and other imide resins. These can be used singly or combined for use. Among these resins, cellulose ester resins, cycloolefin resins, polystyrene resins, imide resins, and polymethacrylate resins are preferably employed due to their birefringence caused by molecular orientation and their relatively low photo-elastic coefficients. The resin preferably accounts for 5 to 99 weight %, preferably accounts for 20 to 99 weight %, and more preferably accounts for 50 to 95 weight % of the polarizing plate protective film.

The method of fabricating the film by adding the durability-enhancing agent to the composition for manufacturing the polarizing plate protective film (dope), the method of adsorbing it to the surface of the film or of impregnating a surface layer region with it by the above coating method, or the like can be used to incorporate the durability-enhancing agent into the polarizing plate protective film. The content of the durability-enhancing agent in the composition for fabricating the polarizing plate protective film is preferably 0.01 to 30 weight parts, more preferably 0.01 to 10 weight parts, and most preferably, 1.0 to 10 weight parts, per 100 weight parts of resin constituting the polarizing plate protective film.

With the exception that the durability-enhancing agent is added to the composition for fabricating the polarizing plate protective film, the polarizing plate protective film containing the durability-enhancing agent can be fabricated by any known method without limitation. For example, a polarizing plate protective film containing the durability-enhancing agent can be fabricated by the melt film fabrication method or the solution film fabrication method (solvent casting method).

JP-A-No. 2005-104149 and JP-A-No. 2012-014148, paragraphs 0034 to 0040, can be referred to with regard to the resin constituting the polarizing plate protective film, additives, and manufacturing methods. The contents of the above publication are expressly incorporated herein by reference in their entirety.

Commercial and known polarizing plate protective films can be employed as polarizing plate protective films not containing the durability-enhancing agent. Examples are commercial cellulose triacetate films (Fujitac TD80UF, made by Fujifilm Corporation), the polymer resin film comprising an alicyclic structure described in JP-A-No. 2006-58322, and the acrylic resin film described in JP-A-No. 2009-122644. The contents of the above publication are expressly incorporated herein by reference in their entirety.

The polarizing plate protective film can be provided directly, or indirectly over one or more other layers, on the surface of the polarizer layer. A polarizing plate protective film can be provided on one or both sides of the polarizer layer.

When the polarizing plate according to an aspect of the present invention comprises two polarizing plate protective films, they can be identical polarizing plate protective films or different polarizing plate protective films. The thickness of a polarizing plate protective film is normally 5 to 300 μm, preferably 10 to 200 μm, and preferably 15 to 100 μm.

<2-6. Other Layers that can be Provided in the Polarizing Plate>

The polarizing plate according to an aspect of the present invention can comprise functional layer(s) such as a phase difference layer, antireflective layer, hard coat layer, forward-scattering layer, and antiglare layer. Such functional layers can take the form of laminations on a polarizing plate protective layer, can be included in a film having the functional layer(s) or can be combined with an optical film such as an optical compensation film or brightness-enhancement film. JP-A-No. 2007-86748, paragraphs 0257 to 0276, can be referred to with regard to function-imparting antireflective films, brightness-enhancement films, other functional optical films, hard coat layers, forward-scattering layers, and antiglare layers. The content of the above publication is expressly incorporated herein by reference in its entirety.

The polarizing plate according to an aspect of the present invention can also be employed as a functional optical film further provided with functional layer(s) such as a gas barrier layer, lubricating layer, antistatic layer, undercoating layer, and protective layer. These functional layers can be provided on either the polarizer layer side, the opposite side from the polarizer layer side (the side closer to air side), or both sides for use. JP-A-No. 2005-104149, JP-A-No. 2012-014148, paragraphs 0139 to 0160, and the like can be referred to with regard to functions that can be combined into these polarizing plate protective films. The contents of the above publication are expressly incorporated herein by reference in their entirety.

<2-7. Shape of the Polarizing Plate>

The shape of the polarizing plate includes not just polarizing plates in the form of pieces of film of a size that can be cut to permit assembly into liquid crystal display devices as is, but also polarizing plates in a form that is continuously produced, fabricated in an elongated shape, and wound up into rolls (forms such as roll lengths of 2,500 m or more or 3,900 m or more). The width of the polarizing plate is preferably greater than or equal to 1,000 mm for use as a polarizing plate in a large-screen liquid crystal display device.

<2.8 Polarizing Plate Performance>

The preferable optical characteristics of a polarizing plate are described in JP-A-No. 2007-086748, which is expressly incorporated herein by reference in its entirety, paragraphs 0238 to 0255. The polarizing plate according to one aspect of the present invention preferably possesses these characteristics.

<2-9. Polarizing Plate Manufacturing Step>

The polarizing plate can be manufactured by bonding various layers such as the polarizer layer, through adhesive layers as needed.

In the course of bonding the polarizer layer and the polarizing plate protective film, the bonding is preferably conducted so that the transmission axis of the polarizer layer and the slow axis of the polarizing plate protective film are parallel, perpendicular, or at 45°.

As set forth above, the parallel, perpendicular, or 45° includes the scope of error that is permitted in the field of art to which the present invention belongs. For example, it means within a range of ±less than 10° from the precise angle as relates to parallel and perpendicular. The difference with respect to a precise angle is preferably less than or equal to 5°, more preferably less than or equal to 3°. The term "parallel" as relates to the transmission axis of the polarizer layer and the slow axis of the polarizing plate protective film preferably means that the angle formed by the direction of the main refractive index nx of the polarizing plate protective film and the direction of the transmission axis of the polarizing plate is preferably less than or equal to 5°, more preferably less than or equal to 1°, and most preferably, less than or equal to 0.5°. The difference of less than or equal to 1° is preferably in that the polarization performance of the polarizing plate tends not to drop in a crossed-nicols state and light leakage can be reduced effectively.

In addition to the various layers set forth above, examples of constituent members of the polarizing plate include a liquid crystal cell, the transparent substrate of the display device such as an organic EL panel, and a front plate disposed to protect the display device.

[3. Liquid Crystal Display Device]

The liquid crystal display device according to one aspect of the present invention will be described next.

FIG. 1 is an example of a schematic diagram showing an example of a liquid crystal display device according to an aspect of the present invention.

In FIG. 1, liquid crystal display device 10 is comprised of a liquid crystal cell having a liquid crystal layer 5, a liquid crystal cell upper electrode substrate 3 and liquid crystal cell lower electrode substrate 6 disposed above and below, respectively, and an upper polarizing plate 1 and lower polarizing plate 8, disposed on either side of the liquid crystal cell. The lamination is such that the absorption axis 2 of upper polarizing plate 1 of the liquid crystal cell is perpendicular to the absorption axis 9 of lower polarizing plate 8. A color filter can be disposed between the liquid crystal cell and each of the polarizing plates. When liquid crystal display device 10 is employed as a transmitting type, a hot or cold cathode fluorescent tube or a backlight with a light source in the form of a light-emitting diode, a field emission element, or an electroluminescent element is disposed in the rear.

Upper polarizing plate 1 and lower polarizing plate 8 are often used in a laminated configuration comprised of polarizers each of which is sandwiched between two polarizing plate protective films. In liquid crystal display device 10, optical compensation films can be used as the protective films on the liquid crystal cell side of the polarizing plates. Alternatively, without protective films, the polarizer layers and electrodes 3 and 6 can be directly bonded with adhesive layers.

Liquid crystal display device 10 can be of the image direct-view, image projection, or light modulation type. The driving mode of liquid crystal layer 5 can be any mode such as TN mode, VA mode, or transverse electric field mode including IPS mode, or some known mode such as OCB mode or ECB mode.

Although not shown, in another configuration, the polarizing plate according to an aspect of the present invention can be used as part of a round polarizing plate disposed to prevent reflection of a self-emitting element such as organic EL or the like, or a reflective type or semi-transparent type liquid crystal display device.

EXAMPLES

Examples are given below to further specifically describe the present invention. Suitable modification of the materials, reagents, quantities and ratios of materials, operations and the like indicated in Examples below is possible without departing from the spirit of the present invention. Accordingly, the scope of the present invention is not limited to the specific examples given below.

1. Fabrication of Polarizing Plate

[1-A. Fabrication of Polarizing Plates 1 to 3 and 5 to 9]

<1-A-1. Fabrication of Polarizer (Polarizer Layer)>

Polyvinyl alcohol film (VF-PS7500 made by Kuraray; 75 μm in thickness) was used as the raw film. The polyvinyl alcohol film was subjected to each of the following steps in the sequence given below.

(Swelling Step)

Pure water was used as the processing liquid in the swelling bath. The polyvinyl alcohol film was conveyed to a swelling bath and caused to swell by stretching it 2.2-fold while immersing it for 1 minute in pure water adjusted to 30° C. to induce swelling (Dyeing Step)

A dyeing bath processing liquid in the form of a 30° C. iodine-dyeing solution containing 0.045 weight % of iodine and 0.315 weight % of potassium iodide was employed. The polyvinyl alcohol film, which had been subjected to the above swelling treatment, was conveyed to the dyeing bath and dyed by being stretched to a stretching ratio of 3.3-fold relative to its original length while being immersed for 30 seconds in the iodine dyeing bath adjusted to 30° C.

[Crosslinking Step]

A processing liquid of a crosslinking bath in the form of a mixed aqueous solution (1) containing 3 weight % of boric acid and 3 weight % of potassium iodide was employed. The polyvinyl alcohol film that had been processed as set forth above was conveyed to the crosslinking bath, and stretched to a stretching ratio of 3.6 fold relative to its original length while being immersed for 30 seconds in mixed aqueous solution (1) adjusted to 30° C.

(Stretching Step)

A processing liquid of a stretching bath in the form of a mixed aqueous solution (2) containing 4 weight % boric acid and 5 weight % potassium iodide was employed. The polyvinyl alcohol film that had been processed as set forth above was conveyed to the stretching bath, and stretched to a stretching ratio of 6.0-fold relative to its original length while being immersed for 60 seconds in mixed aqueous solution (2) adjusted to 60° C.

(Cleaning Step)

A processing liquid of a cleaning bath in the form of an aqueous solution containing 3 weight % of potassium iodide was employed. The polyvinyl alcohol film that had been processed as set forth above was conveyed to the cleaning bath and immersed for 10 seconds in the aqueous solution adjusted to 30° C.

(Drying Step)

Next, the polyvinyl alcohol film processed as set forth above was drained of water, and while being held so as to inhibit contraction, dried for 4 minutes in an oven at 60° C. to obtain a polarizer.

<1-A-2. Adhering the Polarizing Plate Protective Film>

A cellulose acetate film (product name Fujitac TD80 UF) made by Fujifilm Corporation was immersed for 3 minutes at 55° C. in a 2.3 mol/L sodium hydroxide aqueous solution. The film was cleaned in a water rinsing tank at room temperature and neutralized with 0.05 mol/L sulfuric acid at 30° C. It was then cleaned again in the water rinsing tank at room temperature and dried with 100° C. hot air. The surface of the polarizing plate protective film was thus subjected to a saponification treatment.

The polarizing plate protective film that had been saponified was adhered to one of the surfaces of the polarizer layer fabricated above with a polyvinyl alcohol adhesive. In this process, the two (i.e., the polarizing plate protective film and the polarizer layer) were disposed so that the transmission axis of the polarizer was parallel to the slow axis of the polarizing plate protective film.

<1-A-3. Applying the Compound to the Polarizer Layer>

For polarizing plates 1 to 3 and 5 to 9, the various compounds given in Table 1 were dissolved in the solvents listed in Table 1 to prepare 0.085 mol/L solutions. This solution was then coated with a bar coater #30 to achieve the coating quantity value indicated in Table 1 on the surface on the opposite side from the surface on which the polarizing plate protective film had been adhered on the polarizer layer, and dried for 90 seconds at 80° C.

Polarizing plates containing various compounds on at least the surface or a surface layer region including the surface were fabricated in this manner.

[1-B. Fabrication of Polarizing Plate 4]

With the exception that the compound was not applied to the polarizer layer, a polarizing plate was fabricated in the same manner as above.

2. Measuring the Crossed Transmittance and the Amount of Change in the Crossed Transmittance The surfaces of polarizing plates 1 to 3 and 5 to 9 to which the various above compounds had been applied were adhered to glass plate with a pressures-sensitive adhesive (Soken Chemical and Engineering SK-2057) to fabricate polarizing plate samples (about 5 cm×5 cm).

With regard to polarizing plate 4, a polarizing plate sample was fabricated by the same method as that set forth above with the exception that the opposite surface from the surface to which the polarizing plate protective film had been adhered was adhered to a glass plate with the adhesive.

The transmittance of the polarizing plate samples thus prepared was measured over a range of 380 nm to 780 nm with a VAP-7070 automatic polarizing film measuring device made by JASCO (Ltd.) and the average value for 10 measurements at a wavelength of 410 nm was adopted as the transmittance (crossed transmittance). The other measurement details were as set forth above.

Subsequently, the crossed transmittance at a wavelength of 410 nm was measured as the average value of 10 measurements by the same method after keeping the various polarizing plate samples for 500 hours under conditions of 60° C. and relative humidity of 95% RH.

The crossed transmittances before and after the above keeping were measured in an environment of 25° C. and relative humidity of 60% RH.

The amount of change in crossed transmittance over time was calculated from the values obtained above.

The polarizing plate preferably had a crossed transmittance CT at a wavelength of 410 nm of CT≤2.0, more preferably a range of CT≤1.3, yet more preferably CT≤0.6 (the unit being % in all of these cases), and most preferably, CT≤0.05. The lower the crossed transmittance at a wavelength of 410 nm, the less light leakage there was in the vicinity of a wavelength of 410 nm. By contrast, the higher the crossed transmittance at a wavelength of 410 nm, the greater the light leakage in the vicinity of a wavelength of 410 nm and the greater the bluish tint in the black state of the display device. From the perspective of increasing the contrast ratio in the liquid crystal display device, it is preferable to reduce such light leakage and preferable to reduce the light leakage occurring after the keeping.

3. Measuring the Amount of Change in Hue

For polarizing plates 1 to 9, 10 polarizing plates each that were identical to those fabricated by the above method were fabricated, the various polarizing plate samples were stored for 500 hours in an environment of 60° C. and relative humidity of 90% RH (i.e., in a hygrothermal environment), and the transmittance of one polarizing plate (single transmittance) was measured with a measuring device (VAP-7070 automatic polarizing film measuring device made by JASCO (Ltd.)). The color difference $\Delta E^*ab$ was calculated by the equation given below in the 1976 L*a*b* color space based on the Commission Internationale de l'Eclairage (CIE) from the single transmittance that was measured. The average value (arithmetic average) of the $\Delta E^*ab$ values was calculated for 10 polarizing plates for each of polarizing plates 1 to 9. The single transmittance was measured in an environment of 25° C. and relative humidity of 60% RH.

$$\Delta E^*ab = [(\Delta L^*)^2 + (\Delta a^*)^2 + (\Delta b^*)^2]^{1/2}$$

The amount of change in hue was calculated as the amount of change relative to color for the color difference $\Delta E^*ab$ of polarizing plate 4 (a blank sample in which no compound was added to the polarizer layer) by the following equation.

Amount of relative change in hue=color difference $\Delta E^*ab$ of each polarizing plate/color difference $\Delta E^*ab$ of polarizing plate 4

4. Calculation of E1 and E2 of Compounds Applied to Polarizer Layer

The E1 and E2 of the various compounds listed in Table 1 were calculated as the DFT (B3LYP/6-311++G (d.p)) levels of the energy of the most stable structure in a ground state using quantum computational software Gaussian 09 (Revision D.01) produced by Gaussian Corp. by the method set forth above.

5. Measurement of the Polyiodide Ion $I_5^-$ Forming Ability in an Iodide Compound-Containing Solution of the Compounds Applied to the Polarizer Layer For each of the compounds listed in Table 1, the polyiodide ion $I_5^-$ forming ability in iodide compound (potassium iodide) solutions was determined by the method described above (residence time in pressure-resistant test tube in hot water bath: 2 hours). A UV3100 PC made by Shimadzu Corp. was used as the spectrophotometer.

Since the absorbance of the reference solution at a wavelength of 355 nm was 0.0, in each measurement, the absorbance at a wavelength of 355 nm of the solution of the targeted compound was adopted as the polyiodide ion $I_5^-$ forming ability in an iodide compound (potassium iodide) solution.

The results of the above are given in Table 1.

TABLE 1

| | Compound | Solvent* | Coating quantity (mmol/m$^2$) | Bond dissociation energy E1 (kcal/mol) | Peroxide radical forming energy E2 (kcal/mol) | polyiodide ion $I_5^-$ forming ability | Cross transmittance (1)Before keeping (%) | Cross transmittance (2)After keeping at 60° C. and relative humidity of 95% for 500 hours (%) | Amount of change (2) − (1) (%) | Change in hue of single plate $\Delta E^*ab$ Amount of relative change |
|---|---|---|---|---|---|---|---|---|---|---|
| Polarizing plate 1 | Xanthene | MeOH | 4.4 | 78.2 | −7.6 | 0.0 | 0.02 | 0.10 | 0.08 | 0.81 |
| Polarizing plate 2 | Xanthydrol | MeOH | 4.4 | 75.1 | −7.3 | 0.0 | 0.02 | 0.14 | 0.12 | 0.95 |
| Polarizing plate 3 | 9,10-dihydroanthracene | MeOH | 4.4 | 81.5 | −9.6 | 0.0 | 0.02 | 0.05 | 0.03 | 0.78 |
| Polarizing plate 4 | None | — | 0 | — | — | — | 0.02 | 0.22 | 0.20 | 1.00 |
| Polarizing plate 5 | 2-azabicyclo[2.2.1]hepta-5-en-3-on | THF | 2.2 | 112.7 | −39.9 | 0.0 | 0.02 | 0.24 | 0.21 | 0.98 |
| Polarizing plate 6 | 3-methyl-2,4-pentanedione | THF | 4.4 | 93.2 | −15.8 | 0.0 | 0.02 | 0.23 | 0.21 | 1.06 |

TABLE 1-continued

| | Compound | Solvent* | Coating quantity (mmol/m²) | Bond dissociation energy E1 (kcal/mol) | Peroxide radical forming energy E2 (kcal/mol) | polyiodide ion $I_5^-$ forming ability | Cross transmittance (1)Before keeping (%) | (2)After keeping at 60° C. and relative humidity of 95% for 500 hours (%) | Amount of change (2) − (1) (%) | Change in hue of single plate ΔE*ab Amount of relative change |
|---|---|---|---|---|---|---|---|---|---|---|
| Polarizing plate 7 | Dimethyl methoxymalonate | THF | 4.4 | 89.7 | 9.4 | 0.0 | 0.02 | 0.25 | 0.22 | 1.00 |
| Polarizing plate 8 | Ethyl plenylcyanoacetate | THF | 4.4 | 82.6 | 1.7 | 0.0 | 0.02 | 0.23 | 0.20 | 0.98 |
| Polarizing plate 9 | Compound 1 below | MeOH | 4.4 | 87.1 | −4.8 | 5.0 | 0.02 | 0.09 | 0.07 | 1.07 |

(*MeOH: Methanol, THF: Tetrahydrofuran)

Compound 1

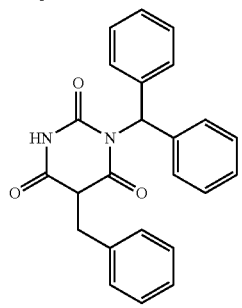

Polarizing plates 1 to 3 were fabricated by applying, to a polarizer layer, a compound (durability-enhancing agent) with a bond dissociation energy E1 of less than or equal to 90.0 kcal/mol, a peroxide radical forming energy E2 of less than or equal to 0.0 kcal/mol, and a polyiodide ion $I_5^-$ forming ability in an iodide compound-containing solution of less than or equal to 1.0. As shown in Table 1, compared to polarizing plate 4 (blank sample), polarizing plates 1 to 3 exhibited lower amounts of change in hue over time and lower amounts of change in crossed transmittance over time, so change in crossed transmittance and the change in hue after the keeping in the above environment were considered to have been inhibited. By mounting these polarizing plates, it was possible to fabricate a liquid crystal display device that was capable of maintaining good image quality for long periods, with reduced light leakage in a black state and reduced tinting in a white state.

By contrast, polarizing plates 5 to 8 were polarizing plates that were fabricated by applying a compound in which E1 or E2 was outside the ranges stated above. As indicated in Table 1, polarizing plates 5 to 8 were not considered to exhibit greater change in both crossed transmittance and color following storage than polarizing plate 4 (blank sample).

Additionally, polarizing plate 9 was fabricated by applying to the polarizer layer a compound with a polyiodide ion $I_5^-$ forming ability in an iodide compound-containing solution that was outside the range set forth above. As indicated in Table 1, polarizing plate 9 did not exhibit a large difference in change in hue relative to polarizing plate 4 (blank sample) over time, and a large improvement in change in crossed transmittance over time was confirmed. In the liquid crystal display device, ways of maintaining good image quality over long periods include considering means of greatly reducing light leakage in a black state over time in the manner of polarizing plate 9, and the means of reducing tinting in a white state in a manner balanced with light leakage in a black state over time in the manner of polarizing plates 1 to 3. Each of these methods is capable of maintaining good image quality over long periods in a liquid crystal display device. The fact that a polarizing plate according to an aspect of the present invention was capable of maintaining good image quality for long periods by the latter means was demonstrated by the above results.

In the accompanying drawing, numeral 1 represents an upper polarizing plate, numeral 2 represents the direction of an absorption axis of the upper polarizing plate, numeral 3 represents an upper electrode substrate of a liquid crystal cell, numeral 5 represents a liquid crystal layer, numeral 6 represents a lower electrode substrate of a liquid crystal cell, numeral 8 represents a lower polarizing plate, numeral 9 represents the direction of an absorption axis of a lower polarizing plate, and numeral 10 represents a liquid crystal display device.

The present disclosure relates to the subject matter contained in Japanese Patent Application No. 2014-171023 filed on Aug. 25, 2014, which is expressly incorporated herein by reference in its entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:
1. A polarizing plate,
which comprises at least a polarizer layer comprised of an iodine-dyed polyvinyl alcohol film, wherein
the iodine-dyed polyvinyl alcohol film comprises:

iodine molecules $I_2$, monoiodide ions $I^-$ and polyiodide ions $I_3^-$,
80 weight % or more of polyvinyl alcohol resin, and
0.01 to 10 weight parts per 100 weight parts of the polyvinyl alcohol resin, of one or more compounds selected from the group consisting of a compound, the chemical structure of which is:

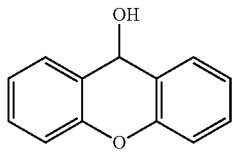 [SMILES: OC1c2ccccc2Oc2ccccc21]

and a compound, the chemical structure of which is:

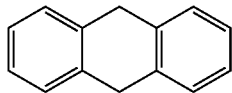 [SMILES: c1ccc2c(c1)Cc1ccccc1C2]

wherein the one or more compounds have a bond dissociation energy E1 of less than 90.0 kcal/mol, a peroxide radical forming energy E2 of less than −5.0 kcal/mol, and a polyiodide ion $I_5^-$ forming ability of less than or equal to 0.0.

2. The polarizing plate according to claim 1, wherein the compound is present at least in a surface layer region including the surface of the polarizer layer.

3. The polarizing plate according to claim 2, which comprises a protective film on one of, or each of surfaces of the polarizer layer.

4. The polarizing plate according to claim 1, which comprises a protective film on one of, or each of surfaces of the polarizer layer.

5. A method of manufacturing a polarizing plate, wherein
the polarizing plate comprises at least a polarizer layer comprised of an iodine-dyed polyvinyl alcohol film,
the iodine-dyed polyvinyl alcohol film comprising:
iodine molecules $I_2$, monoiodide ions $I^-$ and polyiodide ions $I_3^-$,
80 weight % or more of polyvinyl alcohol resin, and
0.01 to 10 weight parts per 100 weight parts of polyvinyl alcohol resin, of one or more compounds selected from the group consisting of a compound, the chemical structure of which is:

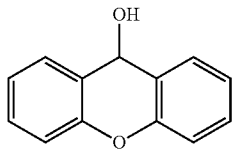 [SMILES: OC1c2ccccc2Oc2ccccc21]

and a compound, the chemical structure of which is:

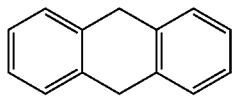

wherein the one or more compounds have a bond dissociation energy E1 of less than 90.0 kcal/mol, a peroxide radical forming energy E2 of less than −5.0 kcal/mol, and a polyiodide ion $I_5^-$ forming ability of less than or equal to 0.0;
the method comprising a step of forming the iodine-dyed polyvinyl alcohol film, and thereby the polarizing plate.

6. The method of manufacturing a polarizing plate according to claim 5, which comprises:
a step of dyeing a polyvinyl alcohol film with an iodine dye, and
a step of forming a polarizer layer comprising the compound by applying the compound to the polyvinyl alcohol film at least one from among before the dyeing step, during the dyeing step, and after the dyeing step.

7. The method of manufacturing a polarizing plate according to claim 6, wherein the applying of the compound is conducted by coating a solution comprising the compound to at least one surface of the polyvinyl alcohol film that has been dyed with iodine.

8. A liquid crystal display device comprising a polarizing plate, wherein
the polarizing plate comprises at least a polarizer layer comprised of an iodine-dyed polyvinyl alcohol film, wherein
the iodine-dyed polyvinyl alcohol film comprises:
iodine molecules $I_2$, monoiodide ions $I^-$ and polyiodide ions $I_3^-$,
80 weight % or more of polyvinyl alcohol resin, and
0.01 to 10 weight parts per 100 weight parts of the polyvinyl alcohol resin, of one or more compounds selected from the group consisting of a compound, the chemical structure of which is:

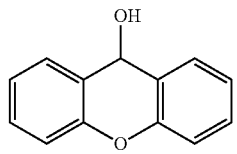 [SMILES: OC1c2ccccc2Oc2ccccc21]

and a compound, the chemical structure of which is:

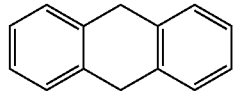 [SMILES: c1ccc2c(c1)Cc1ccccc1C2]

wherein the one or more compounds have a bond dissociation energy E1 of less than 90.0 kcal/mol, a peroxide radical forming energy E2 of less than −5.0 kcal/mol, and a polyiodide ion $I_5^-$ forming ability of less than or equal to 0.0.

9. The liquid crystal display device according to claim 8, wherein, in the polarizing plate, the compound is present at least in a surface layer region including the surface of the polarizer layer.

10. The liquid crystal display device according to claim 9, wherein the polarizing plate comprises a protective film on one of, or each of surfaces of the polarizer layer.

11. The liquid crystal display device according to claim 8, wherein the polarizing plate comprises a protective film on one of, or each of surfaces of the polarizer layer.

* * * * *